US011506083B2

(12) United States Patent
Kappes et al.

(10) Patent No.: US 11,506,083 B2
(45) Date of Patent: Nov. 22, 2022

(54) COMPOSITE LINERS FOR TURBOFAN ENGINES

(71) Applicant: Rolls-Royce Corporation, Indianapolis, IN (US)

(72) Inventors: Matthew J. Kappes, Greenwood, IN (US); Robert Heeter, Noblesville, IN (US); Jonathan Michael Rivers, Indianapolis, IN (US); Benedict N. Hodgson, Indianapolis, IN (US)

(73) Assignee: Rolls-Royce Corporalion, Indianapolis, IN (US)

( * ) Notice: Subject to any disclaimer, the term of this patent is extended or adjusted under 35 U.S.C. 154(b) by 19 days.

(21) Appl. No.: 16/891,928

(22) Filed: Jun. 3, 2020

(65) Prior Publication Data

US 2021/0381396 A1  Dec. 9, 2021

(51) Int. Cl.
*F01D 25/24* (2006.01)
*F01D 21/04* (2006.01)
(Continued)

(52) U.S. Cl.
CPC ........... *F01D 25/24* (2013.01); *F01D 21/045* (2013.01); *F01D 25/005* (2013.01);
(Continued)

(58) Field of Classification Search
CPC ........ F01D 5/282; F01D 11/008; F01D 11/08; F01D 25/24; F01D 21/045; F01D 25/005; F01D 25/28; F05D 2220/32; F05D 2240/14; F05D 2250/283; F05D 2260/96; F05D 2300/2102; F05D 2300/224;
(Continued)

(56) References Cited

U.S. PATENT DOCUMENTS 4,957,415 A    9/1990  Paul et al.
5,160,248 A *  11/1992 Clarke .................. F01D 21/045
                                                         428/117
(Continued)

FOREIGN PATENT DOCUMENTS

DE  102010005897 A1  2/2011
WO     2015142395 A2  9/2015

OTHER PUBLICATIONS

"Corporate Technologies," Innegra Technologies, 2014 (Applicant points out, in accordance with MPEP 609.04(a), that the year of publication, 2014, is sufficiently earlier than the effective U.S. filing dale, 2017, so that the particular month of publication is not in issue.) 24 pp.

(Continued)

*Primary Examiner* — Eric J Zamora Alvarez
(74) *Attorney, Agent, or Firm* — Shumaker & Sieffert, P.A.

(57) ABSTRACT

Composite liners (such as acoustic panels, fan track liners, and/or ice impact panels or boxes for turbofan engines) and techniques for forming composite liners. In some examples, the composite liner includes at least one region comprising a reinforcement architecture comprising a matrix material, a plurality of relatively tough polymer-based reinforcement elements, and a plurality of second reinforcement elements. The plurality of relatively tough polymer-based reinforcement elements and the plurality of second reinforcement elements are embedded in the matrix material.

17 Claims, 7 Drawing Sheets

(51) Int. Cl.
*F01D 25/00* (2006.01)
*F02C 7/045* (2006.01)

(52) U.S. Cl.
CPC .... *F05D 2240/14* (2013.01); *F05D 2250/283* (2013.01); *F05D 2260/96* (2013.01); *F05D 2300/2102* (2013.01); *F05D 2300/224* (2013.01); *F05D 2300/433* (2013.01); *F05D 2300/6034* (2013.01)

(58) Field of Classification Search
CPC ........ F05D 2300/433; F05D 2300/603; F05D 2300/6012; F05D 2300/6034
See application file for complete search history.

(56) References Cited

U.S. PATENT DOCUMENTS

| | | | |
|---|---|---|---|
| 5,182,906 A | 2/1993 | Gilchrist et al. | |
| 5,217,283 A | 6/1993 | Watanabe | |
| 5,252,160 A | 10/1993 | Scanlon et al. | |
| 5,344,280 A * | 9/1994 | Langenbrunner | F01D 21/045 |
| | | | 428/116 |
| 6,358,014 B1 | 3/2002 | Chou et al. | |
| 6,416,280 B1 | 7/2002 | Forrester et al. | |
| 6,447,255 B1 | 9/2002 | Bagnall et al. | |
| 6,561,763 B2 | 5/2003 | Breakwell | |
| 6,942,462 B2 | 9/2005 | Breakwell et al. | |
| 8,092,183 B2 | 1/2012 | Borzakian et al. | |
| 8,292,586 B2 | 10/2012 | Bottome | |
| 8,397,865 B2 * | 3/2013 | Douglas | G10K 11/172 |
| | | | 181/292 |
| 8,425,197 B2 | 4/2013 | Breakwell | |
| 8,529,204 B2 | 9/2013 | Bagnall | |
| 8,596,981 B2 | 12/2013 | Hoyland et al. | |
| 8,616,849 B2 | 12/2013 | Menheere et al. | |
| 8,677,622 B2 | 3/2014 | Schreiber | |
| 8,696,319 B2 | 4/2014 | Naik | |
| 8,753,094 B2 | 6/2014 | Bottome | |
| 8,827,651 B2 | 9/2014 | Bottome | |
| 8,911,656 B2 | 12/2014 | Doddman et al. | |
| 9,017,031 B2 | 4/2015 | Bottome | |
| 9,200,595 B2 | 12/2015 | Bottome | |
| 9,228,444 B2 | 1/2016 | Evans et al. | |
| 9,410,431 B2 | 8/2016 | Bottome et al. | |
| 9,481,448 B2 | 11/2016 | Totten et al. | |
| 9,682,450 B2 | 6/2017 | Tomeo et al. | |
| 9,739,162 B2 | 8/2017 | Bottome et al. | |
| 9,752,449 B2 | 9/2017 | Bottome et al. | |
| 2001/0031594 A1 | 10/2001 | Perez et al. | |
| 2005/0053466 A1 | 3/2005 | Finn et al. | |
| 2006/0275132 A1 | 12/2006 | McMillan | |
| 2010/0015394 A1 | 1/2010 | Morrison et al. | |
| 2010/0028594 A1 | 2/2010 | Kray et al. | |
| 2011/0038732 A1 | 2/2011 | Huth et al. | |
| 2011/0142670 A1 | 6/2011 | Pilpel et al. | |
| 2011/0164986 A1 | 7/2011 | Roberts | |
| 2011/0176927 A1 | 7/2011 | Alexander et al. | |
| 2012/0009071 A1 | 1/2012 | Tanahashi et al. | |
| 2012/0034089 A1 | 2/2012 | Wadewitz et al. | |
| 2012/0051935 A1 | 3/2012 | Naik et al. | |
| 2012/0134839 A1 | 5/2012 | Parkin et al. | |
| 2012/0244003 A1 | 9/2012 | Mason | |
| 2012/0257983 A1 | 10/2012 | Williams | |
| 2012/0263596 A1 | 10/2012 | Evans et al. | |
| 2013/0004325 A1 | 1/2013 | McCaffrey et al. | |
| 2013/0105031 A1 | 5/2013 | Dambrine et al. | |
| 2013/0224035 A1 | 8/2013 | Alexander et al. | |
| 2013/0259701 A1 | 10/2013 | Dambrine et al. | |
| 2013/0276459 A1 | 10/2013 | Roberts et al. | |
| 2014/0011414 A1 * | 1/2014 | Kruckenberg | B64C 3/20 |
| | | | 87/8 |
| 2014/0030076 A1 | 1/2014 | Nunez et al. | |
| 2014/0072443 A1 | 3/2014 | Mateo et al. | |
| 2014/0086751 A1 | 3/2014 | Bottome et al. | |
| 2014/0133989 A1 | 5/2014 | Belmonte et al. | |
| 2014/0161621 A1 | 6/2014 | Kray et al. | |
| 2014/0186166 A1 | 7/2014 | Kostka | |
| 2014/0255202 A1 | 9/2014 | Kling et al. | |
| 2014/0286765 A1 | 9/2014 | Hoyland et al. | |
| 2014/0363304 A1 | 12/2014 | Murooka | |
| 2015/0040396 A1 | 2/2015 | Fremont et al. | |
| 2015/0044050 A1 | 2/2015 | Thomas et al. | |
| 2015/0044056 A1 | 2/2015 | Hodgson et al. | |
| 2015/0132134 A1 | 5/2015 | Murdock | |
| 2015/0165571 A1 | 6/2015 | Marchal et al. | |
| 2015/0198174 A1 | 7/2015 | Houle | |
| 2015/0224719 A1 | 8/2015 | Eyb | |
| 2015/0226071 A1 | 8/2015 | Marshall et al. | |
| 2015/0292340 A1 | 10/2015 | Kawanishi et al. | |
| 2015/0300194 A1 | 10/2015 | Bottome et al. | |
| 2015/0377045 A1 | 12/2015 | Chang et al. | |
| 2016/0010459 A1 | 1/2016 | Romanowski et al. | |
| 2016/0032939 A1 | 2/2016 | Anderson et al. | |
| 2016/0076552 A1 | 3/2016 | Anderson et al. | |
| 2016/0101591 A1 | 4/2016 | Khan | |
| 2016/0108741 A1 | 4/2016 | Jevons et al. | |
| 2016/0108746 A1 | 4/2016 | Riehl | |
| 2016/0130952 A1 | 5/2016 | Voleti et al. | |
| 2016/0146021 A1 | 5/2016 | Freeman et al. | |
| 2016/0153295 A1 | 6/2016 | Pautard et al. | |
| 2016/0177743 A1 | 6/2016 | Thomas et al. | |
| 2016/0280846 A1 * | 9/2016 | Karunakaran | C08F 283/065 |
| 2016/0312626 A1 | 10/2016 | Schetzel | |
| 2017/0275210 A1 | 9/2017 | Corman et al. | |
| 2017/0282466 A1 | 10/2017 | Backhouse | |
| 2017/0328223 A1 | 11/2017 | Subramanian et al. | |
| 2018/0036914 A1 | 2/2018 | Marsal et al. | |
| 2018/0038382 A1 | 2/2018 | Foster et al. | |
| 2018/0038385 A1 | 2/2018 | Welch | |
| 2018/0045207 A1 | 2/2018 | Paquin | |
| 2018/0051705 A1 | 2/2018 | Foster et al. | |
| 2018/0065337 A1 | 3/2018 | Grasso et al. | |
| 2018/0112108 A1 * | 4/2018 | Gaw | C09J 163/00 |
| 2019/0329360 A1 * | 10/2019 | Reeves | B23K 26/082 |

OTHER PUBLICATIONS

"Final Report Summary—ORCA (Development of an Optimized Large Scale Engine CFRP annulus filler)," retrieved from hllps://cordis.europa.eu/resull/rcn/147995_en.html, dated Jul. 13, 2018, 3 pp.
"Olefin-Carbon Fiber Hybrid Wins JEC Innovation Award," plasticstoday.com, Oct. 3, 2013, 2 pp.
Black, "Automotive Composites: Thermosets for the Fast Zone," compositesworld.com, Aug. 31, 2015, 6 pp.
Gardiner, "HP-RTM on the Rise," compositesworld.com, Apr. 14, 2015, 6 pp.
Horejsi et al., "FACC AG & CleanSky," CleanSky, Jan. 2011, 18 pp.
Meister et al., "Switzerland: The Engine of the Future," maschinenmarkt, Jan. 20, 2016, 2 pp.
Sloan et al., "GE Aviation, Batesville, MS, US," compositesworld.com, Feb. 8, 2016, 5 pp.
"Fiber," https://www.thefreedictionary.com/fiber, retrieved on Mar. 31, 2020, 6 pp.

* cited by examiner

COMPOSITE LINERS FOR TURBOFAN ENGINES

TECHNICAL FIELD

The present disclosure relates to composite liners for gas turbine engines.

BACKGROUND

Gas turbine engines used to propel vehicles, e.g., aircraft, often include a fan assembly or propeller that is driven by an engine core. In a fan assembly, the fan blows air to provide part of the thrust for moving the aircraft. Fan assemblies typically include a bladed wheel mounted to a shaft coupled to the engine core. The bladed wheel of the fan assembly may include a plurality of airfoils in the form of fan blades coupled to a fan disc. In some examples, gas turbine engines may also include airfoils in the form of circumferentially spaced radially extending outlet guide vanes (OGVs) located aft of the bladed wheel. Gas turbine engine also include a fan case that surrounds the fan assembly. An inner surface of the fan case defines an outer wall of the bypass flow path. Proceeding from the front toward the back of the fan case, the inner surface may include front acoustic panels (FAP), fan track liners (FTL), ice impact panels (IIP), and rear acoustic panels (RAP).

SUMMARY

The disclosure describes composite liners for fan cases of turbofan engines and techniques for forming composite liners. A composite liner as described herein may include a body formed from a composite material, which includes a matrix material, relatively tough polymer-based reinforcement elements, and second reinforcement elements. Such composite liners may be relatively lightweight, yet tough (e.g., reduced brittleness) to increase resistance to fracturing or provide selective sections more prone to fracture when struck by a objects, including birds, ice, fan blades, or the like.

In some examples, the disclosure describes a composite liner that includes at least one region comprising a reinforcement architecture comprising a matrix material, a plurality of relatively tough polymer-based reinforcement elements, and a plurality of second reinforcement elements. The plurality of relatively tough polymer-based reinforcement elements and the plurality of second reinforcement elements are embedded in the matrix material The details of one or more examples are set forth in the accompanying drawings and the description below. Other features, objects, and advantages will be apparent from the description and drawings, and from the claims.

BRIEF DESCRIPTION OF DRAWINGS

FIGS. 7-10B are schematic and conceptual diagrams of example reinforcement structures.

DETAILED DESCRIPTION

The disclosure describes composite liners for turbofan engines and techniques for forming composite liners for turbofan engines. Example composite liners employed in turbofan engines may include front acoustic panels (FAP), fan track liners (FTL), ice impact panels (IIP), and rear acoustic panels (RAP).

In operation, such liners may experience impact damage, which may be referred to foreign object damage (FOD) and may be caused by icestrikes, birdstrikes or the like. Additionally, FTLs may experience impact damage due to impact of damaged fan blades or portions of damaged fan blades. Damage to the liners may cause the liners to be repaired or replaced entirely, which may result in the engine and airframe on which the engine is mounted being out of service during the repairs. Damaged liners may also come apart in operation, causing secondary damage to the engine. The service time may lead to customer frustration due to the downtime and increased service expenses, or failure of the engine. Some liners include fiberglass composite materials. One option for increasing toughness of liners is to include additional material, e.g., in the form of additional glass reinforcement elements. However, this increases weight of the liners, which may lead to other undesirable effects.

Described herein are composite liners that include a matrix material, a plurality of relatively tough polymer-based reinforcement elements, and a plurality of second reinforcement elements. The second reinforcement elements may include, for example, glass fibers, carbon fibers, or the like. The relatively tough polymer-based reinforcement elements have a reduced brittleness compared to the second reinforcement elements, and the material of the relatively tough polymer-based reinforcement elements may have a lower density that the material of the second reinforcement elements. In some examples, a relatively tough polymer-based reinforcement element may have a strain elongation at break of greater than about 6.0%. Example relatively tough polymer-based reinforcement elements include, but are not limited to, polypropylene fibers, polyester fibers, high performance polyethylene fibers, or the like. Example second reinforcement elements include, but are not limited to, aramid fibers, carbon fibers, glass fibers, or the like. Such composite liners may be relatively lightweight due to the lower density of the relatively tough polymer-based reinforcements elements. Additionally, by including relatively tough polymer-based reinforcement elements in addition to the second reinforcement elements, the composite liner may exhibit increased toughness (e.g., reduced brittleness), which may increase resistance to fracturing or other damage when struck by a foreign object, such as birds, ice, hailstones, or the like, or a fan blade or a portion of a fan blade.

A composite liner includes a liner body, which defines a leading (upstream) edge and a trailing (downstream) edge. In some examples, the liner body may form a section of a full circumference of an inner wall of a fan case of the turbofan engine. In such examples, the liner body may include first and second circumferential edges, which each abut edges of adjacent liner bodies. In other examples, the liner body may define a full annulus extending around the full inner circumference of the fan case and defining a radially outer flowpath boundary for flow of air through the bypass flowpath.

The composite liner includes one or more reinforcement architectures that include reinforcement elements substantially encapsulated in a matrix material. Each reinforcement architecture of the one or more reinforcement architectures may include relatively tough polymer-based reinforcement elements, second reinforcement elements, or both relatively tough polymer-based reinforcement elements and second reinforcement elements.

The reinforcement elements included in the composite materials are arranged into two-dimensional or three-dimensional reinforcement architectures. The reinforcement architecture may include woven fabric layers, braided layers, three-dimensional woven volumes, or the like. The relatively tough polymer-based reinforcement elements may be separate from, intermingled with, braided with, or interwoven with the second reinforcement elements, depending on the particular properties selected for a portion of the composite liner. For example, an individual braid or weave, may include a plurality of strands. Each strand of the plurality of strands includes one or more tows (e.g., yarns). Each tow includes a plurality of fibers. A pure braid or pure weave includes only strands having one or more tows that include only fibers of the same material. A hybrid braid or hybrid weave include at least one first strand having one or more tows that include fibers of a first material and a second strand having one or more tows that include fibers of a second, different material. A hybrid braid or a hybrid weave may include more than two types of strands, each strand intermingled by having one or more tows including a different type of fiber. A commingled braid or a commingled weave includes at least one strand having at least one first tow that includes fibers of a first material and at least one second tow that includes fibers of a second, different material. In other words, in a commingled reinforcement element, strands include two types of material, while in a hybrid reinforcement element, strands include a single type of material, and the reinforcement element includes multiple, different strands.

The liner may include a FAP, a FTL, an IIP, or a RAP. The architecture of the liner may depend on whether the liner is a FAP, a FTL, an IIP, or a RAP. For example, for a FAP or a RAP, the liner may include a composite facesheet including a matrix material, a plurality of relatively tough polymer-based elements, and a plurality of second reinforcement elements. In some instances, the second reinforcement elements may include glass fibers. The composite facesheet may be adhered to a support layer, which may include, for example, a honeycomb material. Further, the composite facesheet may include a plurality of perforations to allow soundwaves to pass through the perforations and enable the FAP or RAP to dampen sounds. The composite face sheet forms the radial inner surface of the FAP or RAP.

In some examples, an FTL may include a composite septum that includes a matrix material, a plurality of relatively tough polymer-based elements, and a plurality of second reinforcement elements. The septum may include a combination of the plurality of relatively tough polymer-based elements and the plurality of second reinforcement elements, e.g., in layers, a hybrid braid, a hybrid weave, a commingled braid, or a commingled weave to allow similar or greater toughness at lower weights. The composite septum may be a layer on one or more support layers, such as cellular or honeycomb layer that provides support for the composite septum. In some examples, the FTL also may include an outer tray that is attached to the fan casing. In some implementations, the more brittle second reinforcement elements may be located at positions, such as around fastener apertures and/or near a front flange of the outer tray of the FTL, that cause the outer tray of the FTL to selectively fail at these locations in the event of an impact by a damaged fan blade or portions of a damaged fan blade, referred to as a fan blade off (FBO) event. This may enable forming of a "trap-door" like arrangement to capture the fan blade or portions of fan blade in the event of an FBO event. The more robust and tough fiber would be placed elsewhere from these selective failure locations to ensure that the weakest link remains at the target. The FTL also may optionally include one or more layers of honeycomb to provide mechanical support for the septum. By varying honeycomb density and compressive strength with different layers of tough or stiff layers of reinforcement, a desired configuration can be defined.

As another example, for an IIP, a glass laminate may be replaced with a composite that includes a matrix material, a plurality of relatively tough polymer-based elements, and a plurality of second reinforcement elements. The composite may include layers of matrix material plus a plurality of relatively tough polymer-based reinforcement elements, layers of matrix material plus a plurality of second reinforcement elements, layers of matrix material and both a plurality of relatively tough polymer-based reinforcement elements and a plurality of second reinforcement elements. In examples in which a layer includes both a plurality of relatively tough polymer-based reinforcement elements and a plurality of second reinforcement elements, the multiple types of reinforcement elements may be present as a hybrid braid, a hybrid weave, a a commingled braid, or a commingled weave. In this application, overbraid may be efficient for creation of the reinforcement structure.

Figure 1:
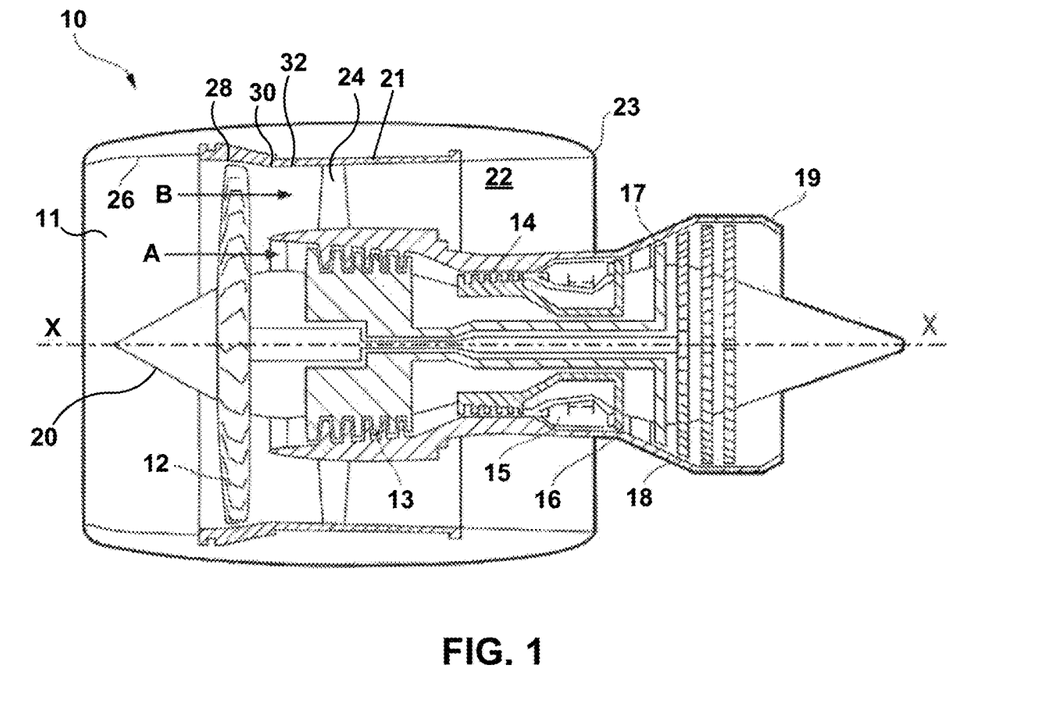
FIG. 1 is a schematic diagram illustrating a longitudinal cross-section view of an example high-bypass gas turbine engine.

FIG. 1 is a schematic diagram illustrating a longitudinal cross-section view of an example high-bypass ducted fan gas turbine engine 10 (or turbofan engine 10). The central axis (e.g., principal and rotational axis) of rotating elements of gas turbine engine 10 is the X-X axis. Gas turbine engine 10 includes an air intake 11, a fan 12, and a core flow system A. The fan 12 includes rotor blades which are attached to a rotor disc. Nosecone (or spinner) 20 may be mounted to fan 12. The core flow system A includes an intermediate-pressure compressor 13, a high-pressure compressor 14, a combustion chamber 15, a high-pressure turbine 16, an intermediate-pressure turbine 17, a low-pressure turbine 18, and a nozzle 19. Furthermore, outside the core flow system A, the gas turbine engine includes bypass flow system B. The bypass flow system B includes a fan case 21, a fan bypass 22, and a fan nozzle 23. In other examples, high-bypass gas turbine engine 10 may include few components or additional components.

Thrust, which propels an aircraft, is generated in a high-bypass gas turbine engine 10 by both the fan 12 and the core flow system A. Air enters the air intake 11 and flows substantially parallel to central axis X-X past the rotating fan 12, which increases the air velocity to provide a portion of the thrust. Outlet guide vanes 24 may be positioned aft of fan 12 to interact with air flowing through bypass flow system B. In some examples, outlet guide vanes 24 may be positioned closer to fan 12. A first portion of the air that passes between the rotor blades of the fan 12 enters the core flow system A, while a second portion enters the bypass flow system B. Air that enters the core flow system A is first compressed by intermediate-pressure compressor 13, then high-pressure compressor 14. The air in core flow system A enters combustion chamber 15, where it is mixed with fuel and ignited. The air that leaves the combustion chamber 15 has an elevated temperature and pressure compared to the air that first entered the core flow system A. The air with elevated temperature and pressure produces work to rotate, in succession, high-pressure turbine 16, intermediate-pressure turbine 17, and low-pressure turbine 18, before ultimately leaving the core flow system A through nozzle 19. The rotation of turbines 16, 17, and 18 rotates high-pressure compressor 14, intermediate pressure compressor 13, and fan 12, respectively. Air that passes through bypass flow system B does not undergo compression or combustion and does not produce work to rotate turbines 16, 17, and 18, but contributes propulsive thrust to gas turbine engine 10.

In accordance with examples of the disclosure, fan case 21 includes at least one liner, which defines a radially outward boundary of bypass flow system B. In the example shown in FIG. 1, fan case 21 includes four separate liners or four separate parts of a liner. The four liners or parts of a liner include front acoustic panel (FAP) 26, fan track liner (FTL) 28, ice impact panel (IIP) 30, and rear acoustic panel (RAP) 32. At least one of, and sometimes all of, FAP 26, FTL 28, IIP 30, and RAP 32 may be a composite liner. As used herein, a composite liner includes at least one portion that includes a matrix material, a plurality of relatively tough polymer-based reinforcement elements, and a plurality of second reinforcement elements. The plurality of relatively tough polymer-based reinforcement elements is different from the plurality of second reinforcement elements. The relatively tough polymer-based reinforcement elements have a higher strain elongation at break than the second reinforcement elements and may be a material having a lower density than the material of the second reinforcement elements. In this way, the relatively tough polymer-based reinforcement elements contribute to the toughness of the composite liner and may also contribute to reduced weight of the composite liner, e.g., compared to a composite liner that includes only second reinforcement elements and omits the relatively tough polymer-based reinforcement elements.

The matrix material may include a polymer configured to substantially surround the relatively tough polymer-based reinforcement elements and second reinforcement elements. The matrix material includes a polymer. For example, the matrix material may include a thermoset polymer, including but not limited to, an epoxy. In some examples, the matrix material may be a polymer that cures at a relatively low temperature, such as less than about 150° C. For example, the matrix material may include CYCOM® 823® (cures at a temperature of about 125° C. in about 1 hour), available from Cytec Solvay Group, Brussels, Belgium; HexPly® M77 (cures at a temperature of about 150° C. in about 2 minutes), HexPly® M76, or HexPly® M92 available from HEXCEL® Corporation, Stamford, Conn.; TC250 (cures at a temperature of about 130° C. in about 2 hours) available from TenCate Advanced Composites, Morgan Hill, Calif.; and Nelcote® E-765 (cures at a temperature of about 135° C. in about 2 hours) available from Park Electrochemical Corp, Melville, N.Y. By curing at a relatively low temperature, the matrix material may enable the composite liner to include relatively tough polymer-based reinforcement elements that undergo thermal degradation (or are otherwise altered) at relatively higher temperatures (e.g., greater than about 150° C.). In some examples, different matrix materials may be used in region(s) or part(s) of the composite liner that include a higher ratio of relatively tough polymer-based reinforcement elements than in region(s) of the composite liner that include a lower ratio of relatively tough polymer-based reinforcement elements. For instance, some second reinforcement elements may be compatible with higher temperature processing while some relatively tough polymer-based reinforcement elements may be incompatible with higher temperature processing. These different layers may be combined into a single liner through adhesive bonding.

The second reinforcement elements may include continuous fibers, short fibers, particulates, or the like. In some examples, the second reinforcement elements have a relatively high tensile modulus, such as greater than 60 GPa. Example reinforcement elements that have an a tensile modulus of greater than 60 GPa include aromatic polyamide fibers, such as Kevlar®, available from E.I. du Pont de Nemours and Company, Wilmington, Del.; carbon fibers, such as carbon fibers derived from polyacrylonitrile fibers; and some glass fibers, such as E-glass (an alumino-borosilicate glass with less than 1% weight-per-weight alkali oxides) or S-glass (an alumino silicate glass excluding CaO and including MgO). In some examples, the tensile modulus of the second reinforcement elements is greater than about 90 GPa, or greater than about 120 GPa, or greater than about 180 GPa, or greater than about 200 GPa. For example, some carbon fibers have a tensile modulus of between about 225 GPa and about 300 GPa.

In some examples, the second reinforcement elements may be relatively brittle, e.g., exhibit a relatively low elongation at break. For example, the second reinforcement elements may have an elongation at break of less than about 6.0%. In some examples, the elongation at break is lower than 6.0%, such as less than about 5.0%, or less than about 2.0%. Because of this, while the composite liner including a matrix material and second reinforcement elements may provide significant stiffness and tensile strength to the composite liner, the impact resistance of the composite liner that includes only a matrix material and second reinforcement elements may be relatively low due to the brittleness of the second reinforcement elements, and the composite liner may suffer brittle failure upon impact from an object, such as a bird, hailstones, a fan blade or portion of a fan blade, or the like. Further, the relatively higher-modulus reinforcement elements may be relatively dense. For example, carbon fibers may have a density of around 1.8 g/cm$^3$, aromatic polyamide fibers may have a density of around 1.4-1.5 g/cm$^3$, and glass fibers may have a density of greater than 2.0 g/cm$^3$. For these reasons, the composite liner includes relatively tough polymer-based reinforcement elements in addition to second reinforcement elements.

The relatively tough polymer-based reinforcement elements have an elongation at break of greater than 6.0%. By exhibiting a higher elongation at break than the relatively higher-modulus reinforcement elements, the relatively tough polymer-based reinforcement elements contribute greater toughness to the composite liner. For example, the composite liner with relatively tough polymer-based reinforcement elements is more resistant to impact damage, such as damage due to impact from a foreign object, such as a bird, a hailstone, or the like.

In some examples, the relatively tough polymer-based reinforcement elements have an elongation at break that is greater than that of both the second reinforcement elements and the matrix material. For example, the elongation at break of the relatively tough polymer-based reinforcement elements is greater than about 6.0%, such as greater than about 10.0%, greater than about 15.0%, greater than about 20.0%, or greater than about 25.0%. The greater elongation at break of the relatively tough polymer-based reinforcement elements (compared to the relatively higher-modulus reinforcement elements) allows the relatively tough polymer-based reinforcement elements to provide at least some structural integrity to the composite liner even if the matrix material cracks or delaminates from the reinforcement fibers.

The relatively tough polymer-based reinforcement elements may include, for example, a polyamide; a polyester or polyester terephthalate (PET), such as Dacron®, available from IVISTA, Wichita, Kans., or Vectran®, available from Kuraray Co., Ltd., Tokyo, Japan; a polypropylene, such as a high modulus polypropylene (HMPP), for example Innegra™ S, available from Innegra Technologies™, Greenville S.C.; a polyethylene, such as high density polyethylene, high performance polyethylene, or ultra-high molecular weight polyethylene; spider silk; or the like.

The reinforcement elements (the relatively tough polymer-based reinforcement elements and/or the second reinforcement elements) may be incorporated in the composite liner in any desired manner. A particular arrangement of matrix material and reinforcement element(s) may be referred to as a reinforcement architecture. Each respective reinforcement architecture may include relatively tough polymer-based elements, second reinforcement elements, or both. A reinforcement architecture includes a particular combination and physical arrangement of materials, such as a matrix material and at least one of a plurality of relatively tougher polymer-based reinforcement elements or a plurality of second reinforcement elements. The reinforcement architecture may include strands, braids, weaves, fabric layers, or the like. As discussed above, strands include one or more tows, and tows include a plurality of fibers. Strands may be configured to form each respective reinforcement including, as discussed above, a pure braid, a pure weave, a hybrid braid, a hybrid weave a commingled braid, a commingled weave, or the like. The composite liner may include one or more reinforcement architectures. The reinforcement architecture for a region of the composite liner may be selected according to desired properties of that portion of the composite liner, such as mechanical properties.

For example, a region of the composite liner (or a reinforcement architecture in the composite liner) may include a uniform reinforcement architecture. The uniform reinforcement architecture includes a composite material which is substantially consistent mixture of a matrix material, a plurality of relatively tough polymer-based reinforcement elements, and a plurality of second reinforcement elements, e.g., throughout an entire volume of the region of the composite liner. This may provide substantially uniform mechanical properties to the region of the composite liner, e.g., substantially uniform stiffness, toughness, and the like. For instance, a skin layer or septum of a FAP, FTL, or RAP or a body of an IIP may include a region (including substantially all of the skin layer or septum) having a uniform reinforcement architecture.

In some examples, the composite liner may include hybrid reinforcement elements. Hybrid reinforcement elements include first strands of relatively tough polymer-based fibers and second strands of second reinforcement fibers. The first strands of relatively tough polymer-based fibers and second strands of second reinforcement fibers are at least one of braided, interwoven, or wound together to form a hybrid reinforcement element. For example, a fabric may include warp yarns that include first strands of relatively tough polymer-based fibers and weft yarns that include second strands of second reinforcement fibers.

In other examples, the composite liner may include commingled reinforcement elements. Commingled reinforcement elements include strands having both relatively tough polymer-based fibers and second reinforcement fibers. In some examples, the composite liner may include commingled reinforcement elements in which commingled strands are braided or interwoven to form a reinforcement element. In other examples, both commingled reinforcement elements (or braids, weaves, or fabrics that include commingled reinforcement elements) and hybrid reinforcement elements may be incorporated in a reinforcement element of the composite liner. For example, a fabric may include warp yarns that include hybrid reinforcement elements and a weft yarns that include commingled reinforcement elements. As another example, a first fabric layer may include hybrid reinforcement elements and a second fabric layer may include commingled reinforcement elements. Other combinations of hybrid reinforcement elements, commingled reinforcement elements, or both are contemplated. Additionally, or alternatively, the relatively tough polymer-based reinforcement elements, the second reinforcement elements, or both may include continuous fibers or filaments, chopped fibers or filaments, or the like. For example, chopped fibers may be used for reinforcements at fastener locations on certain panels.

By including both relatively tough polymer-based reinforcement elements and second reinforcement elements, the composite liner may possess increased toughness (e.g., reduce brittleness) compared to a composite liner that does not include relatively tough polymer-based reinforcement elements, while still possessing relatively high stiffness and tensile strength. Further, as the relatively tough polymer-based reinforcement elements may be less dense than the second reinforcement elements, the composite liner may be lighter than a similar liner that includes only relatively higher-modulus reinforcement elements.

Figure 2:
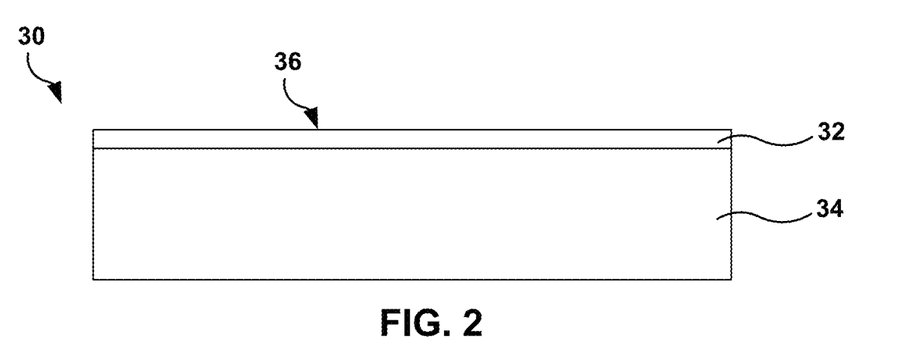
FIG. 2 is a schematic and conceptual cross-sectional diagram illustrating a portion of an example acoustic panel.

FIG. 2 is a schematic and conceptual cross-sectional diagram illustrating an example composite acoustic panel 30. Composite acoustic panel 30 may be a FAP or a RAP. Composite acoustic panel 30 includes a region 32 including a composite material that includes both relatively tough polymer-based reinforcement elements and second reinforcement elements, as described above with reference to FIG. 1.

Region 32 may be a facesheet that defines an outer surface 36 on which air impacts (e.g., that defines an outer circumferential surface of flowpath through gas turbine engine 10 (FIG. 1). Region 32 is on support layer 34. Support layer 34 provides mechanical support for region 32 and may also contribute acoustic properties to composite acoustic panel 30. Composite acoustic panel 30 extends circumferentially and axially (with reference to the longitudinal axis of gas turbine engine 10) from an upstream (leading) edge to a downstream (trailing) edge. In some examples, composite acoustic panel 30 defines a substantially continuous annular shape that extends about the full circumference of gas turbine engine 10. In other examples, composite acoustic panel 30 defines a portion of an annulus, and a plurality of composite acoustic panels 30 are assembled to define the full annular shape and extend around the full circumference of gas turbine engine 10.

Region 32 is on support layer 34. Support layer 34 provides mechanical support for region 32 and may also contribute acoustic properties to composite acoustic panel 30. In some examples, support layer 34 may include a honeycomb layer. The honeycomb layer may be formed from any suitable material, such as an alloy or plastic (e.g., a reinforced plastic composite). For instance, the honeycomb layer may be formed from an aluminum alloy, such as 5052 or 5056 aluminum alloy. Similarly, the honeycomb layer may define any cell size and/or cell shape, and the cell size and/or cell shape may be consistent or vary throughout support layer 34. In some implementations, support layer 34 may include a honeycomb support available under the trade designation Flex-Core® from Toray Advanced Composites USA, Morgan Hill, Calif. Flex-Core® honeycomb may provide greater compressive strength for a given density compared to some hexagonal honeycombs.

Region 32 includes a matrix material, a plurality of relatively tough polymer-based reinforcement elements, and a plurality of second reinforcement elements. The ratio of relatively tough polymer-based reinforcement elements to second reinforcement elements in region 32 may range from greater than zero (nearly no relatively tougher polymer-based reinforcement elements and nearly only second reinforcement elements) to essentially infinite (nearly only relatively tough polymer-based reinforcement elements and nearly no second reinforcement elements).

Region 32 may include a selected reinforcement architecture. The reinforcement architecture may include pure reinforcement elements, hybrid reinforcement elements, commingled reinforcement elements, or combinations thereof. For example, the reinforcement architecture may include relatively tough polymer-based reinforcement elements co-woven with second reinforcement elements in a hybrid weave (e.g., warp yarns that consist of relatively tough polymer-based reinforcement elements and weft yarns that consist of second reinforcement elements, or vice versa). As another example, the reinforcement architecture may include one or more woven layers including commingled strands (e.g., strands including at least one first tow that includes fibers of relatively tough polymer-based reinforcement and at least one second tow that includes fibers of the second reinforcement). In some examples, one of the warp or weft strands may be pure strands and the other of the warp or weft strands may be commingled strands.

Figure 3:
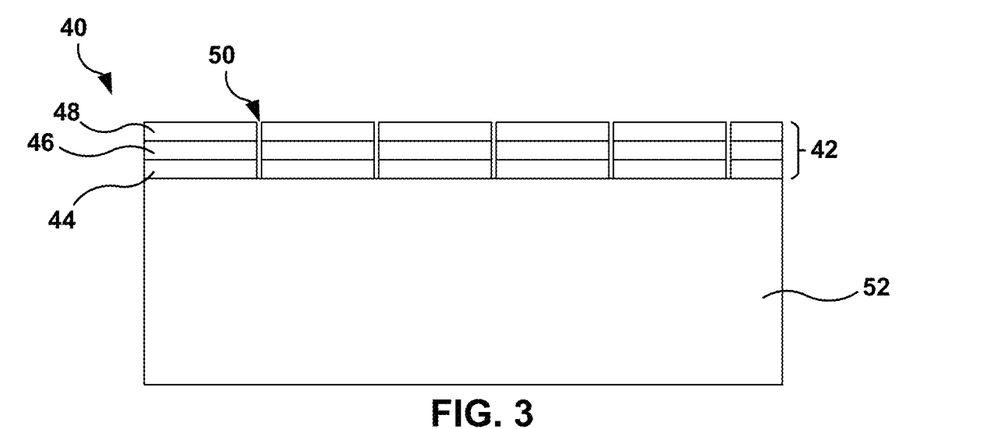
FIG. 3 is a schematic and conceptual cross-sectional diagram illustrating a portion of another example acoustic panel.

In other examples, region 32 may include a plurality of reinforcement architectures, such as a first region that includes a first reinforcement architecture and a second region that includes a second reinforcement architecture. FIG. 3 is a schematic and conceptual cross-sectional diagram illustrating an example composite acoustic panel 40. Composite acoustic panel 40 includes an outer portion 42 that includes a plurality of regions 44, 46, and 48. The first reinforcement architecture may be selected to provide desired properties to first region 44, the second reinforcement architecture may be selected to provide desired properties to second region 46, and the third reinforcement architecture may be selected to provide desired properties to third region 48.

For instance, as shown in FIG. 3, first region 44 may include a first reinforcement architecture that includes including one or more layers, second region 46 may include a second reinforcement architecture that includes including one or more layers, and third region 48 may include a third reinforcement architecture that includes including one or more layers. The number of layers in each region 44, 46, and 48 may be the same or different. In some implementations, the first reinforcement architecture in first region 44 may include a lower ratio of relatively tough polymer-based reinforcement elements to second reinforcement elements, the second reinforcement architecture in second region 46 may include a higher ratio of relatively tough polymer-based reinforcement elements to second reinforcement elements, and the third reinforcement architecture in third region 48 may include a lower ratio of relatively tough polymer-based reinforcement elements to second reinforcement elements. The first and third ratios may be the same or may be different. In this way, first and third regions 44 and 48 may provide relatively greater stiffness and strength, while second region 46 provides relatively greater toughness and lower density.

In other implementations, the first and third reinforcement architectures may include relatively higher ratios of relatively tough polymer-based reinforcement elements to second reinforcement elements, and the second reinforcement architecture may include a lower ratio of relatively tough polymer-based reinforcement elements to second reinforcement elements. In such implementations, second region 46 including the lower ratio of relatively tough polymer-based reinforcement elements to relatively higher modulus reinforcement elements may provide high stiffness to portion (or facesheet) 42, while first and second regions 44 and 48 including the higher ratios of relatively tough polymer-based reinforcement elements to second reinforcement elements may provide high toughness. Such an implementation may result in a stiff, robust, and facesheet for an acoustic panel. Like region 32 of FIG. 2, portion 42 of FIG. 3 is on a support layer 52. Support layer 52 may be similar to or substantially the same as support layer 34.

As shown in FIG. 3, portion 42 (or facesheet) may define a plurality of pores or channels 50 that allow sound through portion 42 (or facesheet) into support layer 44. As support layer 52 may include a honeycomb or similar configuration, this may result in sound suppression.

In some examples, although not shown in FIG. 2 or 3, surface 36 (FIG. 2) may have a layer of material on it. For example, the layer may be an erosion resistant polymeric film that is adhered or co-cured to surface 36. In some examples, the erosion resistant polymeric film may include, for example, a polyvinyl fluoride film available under the trade designation DuPont™ Tedlar®, or a polyurethane film available under the trade designation 3M™ Polyurethane Protective Tape 8734NA. In examples in which the erosion resistant polymeric film is adhered to surface 36, the erosion resistant polymeric film may be replaceable upon damage to the erosion resistant polymeric film while reducing or substantially preventing erosion damage to the underlying acoustic panel. In some examples, erosion resistant polymeric film may have a relatively high elongation at break (e.g., similar to the relatively tough reinforcement elements), which may contribute to toughness of composite acoustic panel 30. The layer of material also may contribute to aesthetic appearance of composite acoustic panel 30, e.g., may cover aesthetic (non-functional) damage to composite acoustic panel 30.

Figures 4, 5:
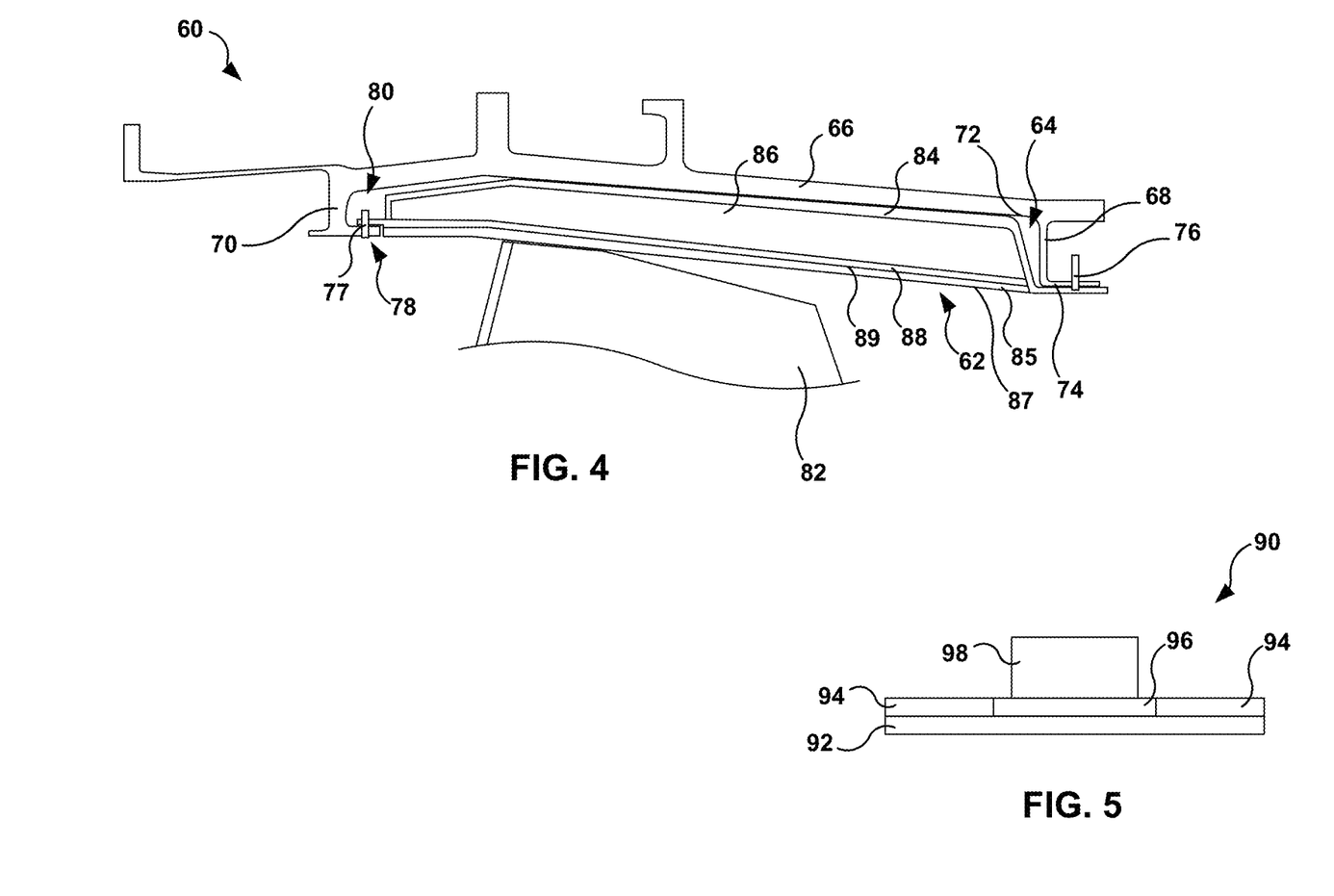
FIG. 4 is a schematic and conceptual cross-sectional diagram illustrating a portion of an example system that includes a composite fan track liner.
FIG. 5 is a schematic and conceptual cross-sectional diagram illustrating a portion of an example composite fan track liner.

In other examples, the liner may be a fan track liner (FTL). FIG. 4 is a schematic and conceptual cross-sectional diagram illustrating a fan track assembly 60 that includes an example composite FTL 62. Blade track assembly 60 is positioned within a cavity 64 defined by a fan case 66. Fan case 66 includes an aft radially extending wall 68, a fore arcuate shaped wall 70, which, together with inner surface 72, define cavity 64. A support member 74 extends from aft radially extending wall 68. Support member 74 provides a mounting surface to which composite FTL 62 is mounted, e.g., via a fastener 76. Fore arcuate shaped wall 70 defines a fan case hook 78, which provides a space 80 for fragments of a blade 82, or other debris, to enter during a catastrophic event. Space 80 further provides a void for composite FTL 62 to collapse partially into during a catastrophic event.

Composite FTL 62 includes an outer tray 84, a core 86, and a septum 88. Septum 88 defines a surface 89 on which an abradable material (not shown in FIG. 4) may be positioned.

Outer tray 84 includes a relatively stiff material that provides backing support for core 86 and septum 88. In some examples, outer tray 84 may include a composite material having one or more selected reinforcement architectures. In some implementations, outer tray 84 includes multiple layers, each layer having the same or a different reinforcement architecture. For example, outer tray 84 may include one or more layers of woven or braided carbon fiber reinforced plastic, where the plastic is any of the matrix materials described herein, and one or more layers that include plastic reinforced with relatively tough polymer-based reinforcement elements, alone, or in combination with second reinforcement elements.

The reinforcement architecture(s) of outer tray 84 may include pure reinforcement elements, hybrid reinforcement elements, commingled reinforcement elements, or combinations thereof. For example, the reinforcement architecture may include relatively tough polymer-based reinforcement elements co-woven with second reinforcement elements in a hybrid weave (e.g., warp yarns that consist of relatively tough polymer-based reinforcement elements and weft yarns that consist of second reinforcement elements, or vice versa). As another example, the reinforcement architecture may include one or more woven layers including commingled strands (e.g., strands including at least one first tow that includes fibers of relatively tough polymer-based reinforcement and at least one second tow that includes fibers of the second reinforcement). In some examples, one of the warp or weft strands may be pure strands and the other of the warp or weft strands may be commingled strands. Alternatively, relatively tough polymer-based reinforcement elements may be braided with second reinforcement elements (e.g., using pure, commingled, or hybrid reinforcement elements, or mixtures thereof). In examples in which the plastic is reinforced with only relatively tough polymer-based reinforcement elements, the layer may act as a galvanic layer to help insulate outer tray 84 from core 86.

Core 86 provides mechanical support between outer tray 84 and septum 88. In some examples, core 86 may include one or more honeycomb layers. The honeycomb layer(s) may be formed from any suitable material, such as an alloy or plastic (e.g., a reinforced plastic composite). For instance, the honeycomb layer may be formed from an aluminum alloy, such as 5052 or 5056 aluminum alloy. Similarly, the honeycomb layer may define any cell size and/or cell shape, and the cell size and/or cell shape may be consistent or vary throughout core 86. In some implementations, core 86 may include a honeycomb support available under the trade designation Flex-Core® from Toray Advanced Composites USA, Morgan Hill, Calif. Flex-Core® honeycomb may provide greater compressive strength for a given density compared to some hexagonal honeycombs.

Septum 88 includes a matrix material, a plurality of relatively tough polymer-based reinforcement elements, and a plurality of second reinforcement elements. The ratio of relatively tough polymer-based reinforcement elements to second reinforcement elements in septum 88 may range from greater than zero (nearly no relatively tougher polymer-based reinforcement elements and nearly only second reinforcement elements) to essentially infinite (nearly only relatively tough polymer-based reinforcement elements and nearly no second reinforcement elements).

Septum 88 may include one or more selected reinforcement architectures. The reinforcement architecture may include pure reinforcement elements, hybrid reinforcement elements, commingled reinforcement elements, or combinations thereof. For example, the reinforcement architecture may include relatively tough polymer-based reinforcement elements co-woven with second reinforcement elements in a hybrid weave (e.g., warp yarns that consist of relatively tough polymer-based reinforcement elements and weft yarns that consist of second reinforcement elements, or vice versa). As another example, the reinforcement architecture may include one or more woven layers including commingled strands (e.g., strands including at least one first tow that includes fibers of relatively tough polymer-based reinforcement and at least one second tow that includes fibers of the second reinforcement). In some examples, one of the warp or weft strands may be pure strands and the other of the warp or weft strands may be commingled strands.

In other examples, septum 88 may include a plurality of reinforcement architectures, such as a first layer or region that includes a first reinforcement architecture and a second layer or region that includes a second reinforcement architecture. The first reinforcement architecture may be selected to provide desired properties to first layer or region and the second reinforcement architecture may be selected to provide desired properties to the second region. In some examples, septum 88 may include a three-region (layer) arrangement, similar to portion 42 shown in FIG. 3.

In some examples, a region having a reinforcement architecture may be located within composite FTL 62 to enable selective failure of the region, e.g., in response to an impact by a damaged fan blade or portions of a damaged fan blade (a fan blade off (FBO) event). For instance, FIG. 5 is a schematic and conceptual cross-sectional diagram illustrating a portion 90 of an example composite FTL. Portion 90 is a part of the composite FTL that is adjacent to a fastener 98 (e.g., fastener 77 of FIG. 4). Portion 90 may be part of septum 88 or outer tray 84, depending on the construction of the composite FTL. For example, rather than septum 88 extending and being attached to fan case 66 (as shown in FIG. 4), outer tray 84 may extend and be attached to fan case 66 in a manner similar to that shown in FIG. 4.

Portion 90 includes a first region 92, a second region 94, and a third region 96. Each of first region 92, second region 94, and third region 96 has a selected reinforcement architecture. Each reinforcement architecture may include only relatively tough reinforcement polymer-based reinforcement elements, only second reinforcement elements, or a mixture of relatively tough reinforcement polymer-based reinforcement elements and second reinforcement elements. The reinforcement architecture may be selected to provide desired properties to the region. For example, first region 92 may be selected to provide strength and rigidity to portion 90 (e.g., septum 88 or outer tray 84) and may include a relatively high ratio of second reinforcement elements to relatively tough polymer-based reinforcement elements. For example, first region 92 may include substantially only second reinforcement elements in a matrix material. Second region 94 may include a reinforcement architecture selected to provide galvanic protection to portion 90 (e.g., septum 88 or outer tray 84) and may include a relatively high ratio of relatively tough polymer-based elements to second reinforcement elements. For example, second region 94 may include substantially only relatively tough polymer-based reinforcement elements in a matrix material. Third region 96 may be configured to mechanically fail more easily than second region 94 in response to a force acting on portion 90, e.g., a force exerted by a fan blade or portions of a fan blade during a fan blade off (FBO) event. As such, third region 96 may be more brittle than second region 94. This may be accomplished by third region 96 including a higher ratio of second reinforcement elements to relatively tough polymer-based reinforcement elements. For instance, third region 96 may include substantially only second reinforcement elements in a matrix material.

Each reinforcement region 92, 94, 96 may include any of the reinforcement architectures described herein, including, for example, a pure braid, a pure weave, a hybrid braid, a hybrid weave, a commingled braid, a commingled weave, a, or the like.

As described above, flow surface 89 may include an abradable layer in some implementations. For example, the abradable layer may include an aramid honeycomb structure available under the trade designation NOMEX® honeycomb from Toray Advanced Composites USA, Morgan Hill, Calif., filled with an epoxy low density filler. Alternatively, the abradable layer may be an unsupported, expanding syntactic film.

Figure 6:
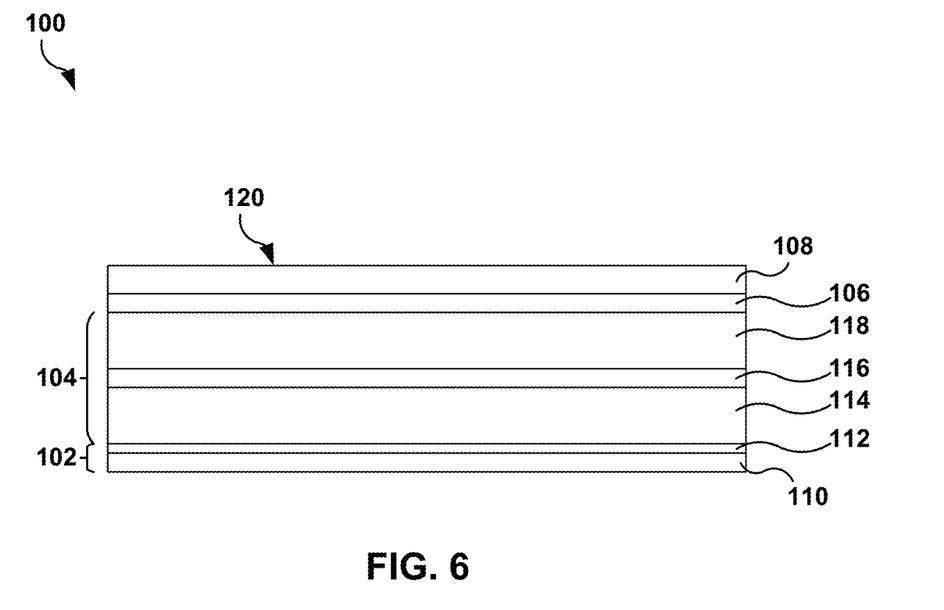
FIG. 6 is a schematic and conceptual cross-sectional diagram illustrating a portion of another example composite fan track liner.

In some examples, a composite fan track liner may include additional layers. For example, FIG. 6 is a schematic and conceptual cross-sectional diagram illustrating a portion 100 of an example composite FTL. Portion 100 may be any portion of a composite FTL, such as composite FTL 62 shown in FIG. 4.

In the example of FIG. 6, portion 100 includes an outer tray 102, a core 104, a septum 106, and an abradable layer 108. Abradable layer 108 defines flow surface 120.

Outer tray 102 includes a first layer 110 and a second layer 112. Each of first layer 110 and second layer 112 may include a selected reinforcement architecture. For example, first layer 110 may include a lower ratio of relatively tough polymer-based reinforcement elements to second reinforcement elements and second layer 112 may include a higher ratio of relatively tough polymer-based reinforcement elements to second reinforcement elements. For instance, second layer 112 may include only relatively tough polymer-based reinforcement elements in a matrix material and first layer 110 may include only second reinforcement elements in a matrix material or may include both relatively tough polymer-based reinforcement elements and second reinforcement elements in a matrix material. In this way, second layer 112 may provide galvanic protection to portion 110 (e.g., electrically isolating portion 110 from core 104) and first layer 110 may provide stiffness and strength to outer tray 102. In other examples, first layer 110 and second layer 112 may include other configurations; each of first layer 110 and second layer 112 may include any of the reinforcement architectures described herein.

Core 104 includes a first support 114, an intermediate layer 116, and a second support 118. Each of first support 114 and second support 118 may include any suitable support structure, such as a honeycomb structure. In some examples, the honeycomb structures of first support 114 and second support 118 may be different. For example, second support 118 may include a denser honeycomb (e.g., a honeycomb with smaller cell sizes, such as ⅛" cell size), while first support 114 includes a less dense honeycomb (e.g., a honeycomb with larger cell sizes, such as ¼" cell size). Intermediate layer 116 may be a composite material, such as glass fiber reinforced plastic, carbon fiber reinforced plastic, glass fiber and carbon fiber reinforced plastic, or any of the reinforcement architectures described herein. This construction may result in progressive spreading of load against flow surface 120 through the thickness of portion 100, while reducing mass compared to having a higher density honeycomb through the entire thickness of core 104. Each of first support 114 and second support 118 may include honeycombs made of any suitable material, including an alloy, plastic (e.g., reinforced plastic composite), or the like.

In some examples, a composite liner is an ice impact panel or ice impact box. An ice impact panel may include a construction generally similar to composite acoustic panel 30 or 40 or composite FTL 62, e.g., may include a support structure and a faceskin or septum on the support structure. The support structure may be a honeycomb structure, or may be a different material. It may also not have any support structure and simply be a box made from composite.

The faceskin or septum of the ice impact panel may include any of the reinforcement architectures described herein. For example, the faceskin or septum may include multiple layers, each layer including a matrix material and reinforcement elements. The reinforcement elements may be the same or different in each layer. For example, a first layer may include second reinforcement elements in a matrix material, a second (middle) layer may include relatively tough polymer-based reinforcement elements in a matrix material, and a third layer may include second reinforcement elements in a matrix material. In other examples, the ice impact panel may include relatively tough polymer-based reinforcement elements co-woven, co-mingled, or in a hybrid architecture with the second reinforcement elements. The reinforcement elements, regardless of their composition, may be woven, braided, or the like.

In some examples, an ice impact box may include sheets of pure, hybrid, or commingled reinforcement elements in matrix material that are laid up over a form, such as a box, then the matrix material is cured. In other examples, an ice impact box may be overbraided around a form, such as a box, using a 3D braiding machine. Such a 3D braided structure may reduce manufacturing costs, reduce weight, and/or increase strength of the ice impact box compared to ice impact boxes formed from sheets.

As described above, a region of a composite liner may include one or more reinforcement architectures. FIGS. 7-11B are conceptual diagrams illustrating example reinforcement architectures. Each region of a composite liner may include different reinforcement architectures, or may include similar reinforcement architectures.

Figure 7:
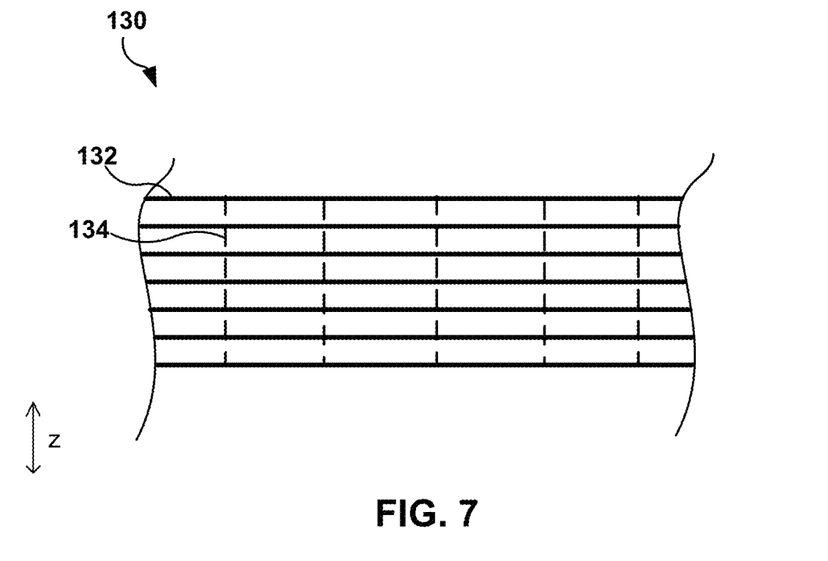

For example, FIG. 7 illustrates a reinforcement architecture 130 that includes a plurality of reinforcement layers 132 and a plurality of z-oriented reinforcement elements 134. Reinforcement layers 132 may include a two-dimensional reinforcement architecture. Reinforcement layers 132 may include second reinforcement elements alone, or intermingled with, braided with, interwoven with, or wound along with the relatively tough polymer-based reinforcement elements, depending on the particular properties selected for reinforcement architecture 130. As described above, an individual braid or weave may include a plurality of strands. Each strand of the plurality of strands includes one or more tows (e.g., yarns). Each tow includes a plurality of fibers. A pure braid or pure weave includes only strands having one or more tows that include only fibers of the same material (e.g., only second reinforcement elements or only relatively tough polymer-based reinforcement elements). A hybrid braid or hybrid weave may include at least one first strand having one or more tows that include fibers of a first material and a second strand having one or more tows that include fibers of a second, different material. A hybrid braid or hybrid weave may include more than two types of strands, each strand intermingled by having one or more tows including a different type of fiber. A commingled braid or commingled weave includes at least one strand having at least one first tow that includes fibers of a first material and at least one second tow that includes fibers of a second, different material. Reinforcement layers 132 may include any combination of pure, hybrid, or commingled braids or weaves.

Z-oriented reinforcement elements 134 include a higher ratio of relatively tough polymer-based reinforcement elements to second reinforcement elements than reinforcement layers 132. In some examples, z-oriented reinforcement elements 134 include substantially only relatively tough polymer-based reinforcement elements. In other examples, z-oriented reinforcement elements 134 include a hybrid or a commingled element. In any case, z-oriented reinforcement elements 134 include a higher ratio of relatively tough polymer-based reinforcement elements to second reinforcement elements than reinforcement layers 132.

Z-oriented reinforcement elements 134 are oriented out of the plane defined by reinforcement layers 132. For example, z-oriented reinforcement elements 134 may be oriented substantially perpendicular to reinforcement layers 132. Z-oriented reinforcement elements 134 improve cohesion between adjacent reinforcement layers 132. This may improve resistance to delamination of reinforcement layers 132 upon foreign object impact (e.g., ice, hail, or the like).

Figure 8:
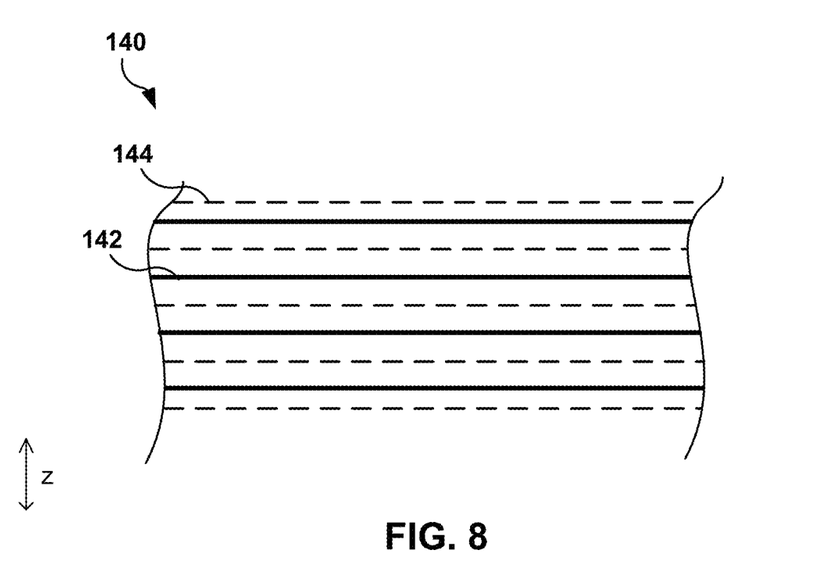

FIG. 8 illustrates a reinforcement architecture 140 that includes a plurality of first reinforcement layers 142 and a plurality of second reinforcement layers 144. Each of first reinforcement layers 142 may be similar to or substantially the same at reinforcement layers 144. Each of second reinforcement layers 144 includes a higher ratio of relatively tough polymer-based fibers to second reinforcement fibers than first reinforcement layers 142. Like z-oriented reinforcement elements 134, plurality of second reinforcement layers 144 may include substantially only relatively tough polymer-based reinforcement elements, a hybrid braid or weave, or a commingled braid or weave.

Figure 9:
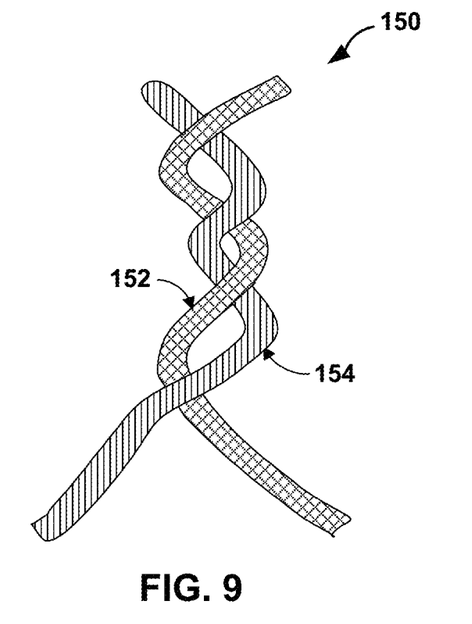

FIG. 9 is a conceptual diagram illustrating an example braid 150 that includes a braided reinforcement architecture including a first reinforcing element 152 (e.g., a first strand of a first reinforcing element) and a second reinforcing element 154 (e.g., a second strand of a second different reinforcing element). First reinforcing element 152 and second reinforcing element 154 may include only relatively tough polymer-based reinforcement elements, only second reinforcement elements, or a selected ratio of both, including, for example, hybrid or commingled reinforcing elements. Although FIG. 9 shows braid 150 including first reinforcing element 152 and second reinforcing element 154, a plurality of reinforcing elements may be braided to form braid 150. For example, braid 150 may include more than two reinforcing elements, such as, tens or hundreds of reinforcing elements. As shown in FIG. 9, braid 150 is substantially linear. In other examples, braid 150 may include other reinforcing architectures, including, complex geometries such as biaxial braid, or triaxial braid. Any suitable braiding technique may be used to form braid 150 including, but not limited to, 2-D braiding, 3-D braiding, circular braiding, over-braiding, four-step braiding, two-step braiding, rotary braiding, and the like.

Braid 150 may improve load distribution compared to other reinforcing architectures (e.g., pure fibers). As one example, braided region 150 may reduce crack propagation by arresting cracking at the intersection of first reinforcing element 152 and second reinforcing element 154. In this way, by including a braid 150 in a composite liner (e.g., a layer or region of the composite liner), the composite liner may be configured to better absorb impacts.

Figure 10A:
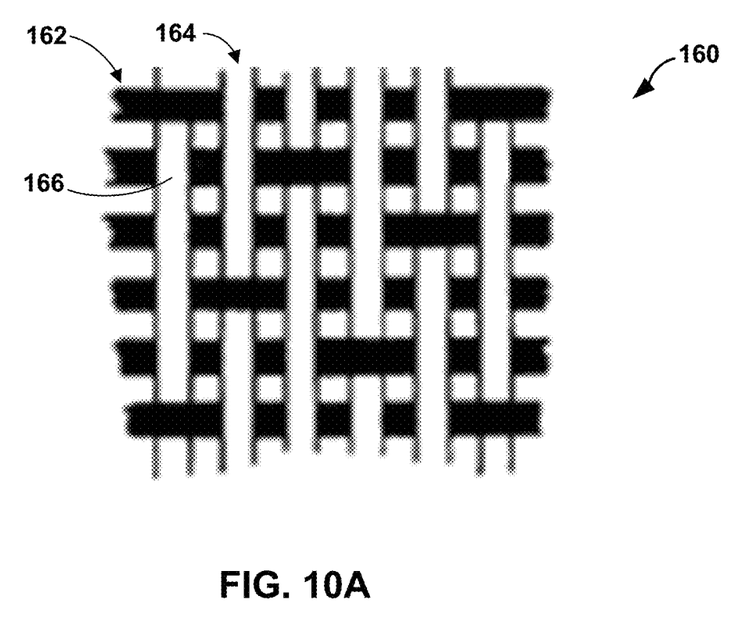

FIG. 10A is a conceptual diagram illustrating an example 5-harness satin weave 160 that includes a woven reinforcement architecture including first reinforcing elements 162 and second reinforcing elements 164. First reinforcing elements 162 include warp yarns of weave 160. Second reinforcing elements 164 include weft yarns (e.g., fill) of weave 160. First reinforcing element 162 and second reinforcing element 164 may intersect at pick 166. In some examples, first reinforcing element 162 and second reinforcing element 164 may include the same material, e.g., relatively tough polymer-based reinforcement elements, second reinforcement elements, or a selected ratio of both, including, for example, hybrid or commingled reinforcing elements. In other examples, first reinforcing elements 162 and second reinforcing elements 164 may include different materials. For example, first reinforcing elements 162 and second reinforcing elements 164 may include different relatively tough polymer-based reinforcement elements, second reinforcement elements, or a selected ratio of both, including, for example, hybrid or commingled reinforcing elements. Weave 160 include a 5-harness satin weave, however, weave 160 may include any weave pattern or combination of weave patterns, including, but not limited to, two-by-two twill weave, satin weave, plain weave, leno weave, and other patterned weaves. Additionally, weave 160 may include any suitable thread count. For example, thread count of weave 160 may be greater than ten-by-ten, such as, twenty-by-twenty or thirty-by-thirty. Weave 160 may include tows (e.g., yarns) of any suitable number of fibers per bundle. For example, weave 160 may include greater than 1,000 fibers per bundle (e.g., 1 k tow), greater than 3,000 fibers per bundle (3 k tow), greater than 10,000 fibers per bundle (10 k tow), or greater than 50,000 fibers per bundle (50 k tow).

Weave 160 may improve load distribution compared to other reinforcing architectures (e.g., unidirectional tapes or filament winding). For example, weave 160 may reduce crack propagation by arresting cracking at a respective pick (e.g., pick 166) of first reinforcing element 162 and second reinforcing element 164. Additionally, or alternatively, weave 160 may include warp yarns, weft yarns, or both that include a selected ratio of relatively tough polymer-based reinforcement elements and/or second reinforcement elements. In this way, by including weave 160 in a composite liner (e.g., a layer or region of the composite liner), the composite liner may be configured to better absorb impacts or withstand other mechanical forces during operation of a gas turbine engine that includes the composite liner.

Figure 10B:
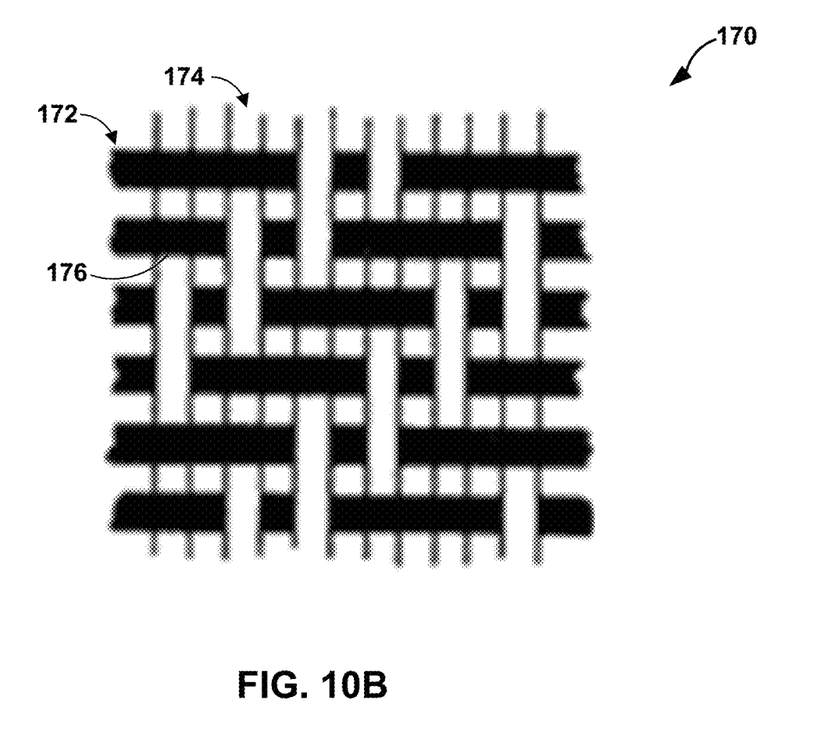

FIG. 10B is a conceptual diagram illustrating an example 2/2 twill weave 170 that includes a woven reinforcement architecture including first reinforcing elements 172 and second reinforcing elements 174 that cross at pick 176. Weave 170 may be the same or substantially similar to weave 180 discussed above, except for the differences described herein. Weave 170 may be the same or substantially similar to weave 160 discussed above, aside from being a 2/2 twill weave 170.

The composite liners described herein may be formed using a variety of techniques, including for example, pre-preg layup and cure, placement of fibers by overbraiding 3-D pre-form and then using resin transfer molding, or the like. The technique may include defining a geometry of a region of the composite liner that includes a composite material. The geometry of the region may be defined using one or more techniques. For example, braided or woven reinforcement elements may be disposed within or about a mold or the like, to define a shape of at least a portion of the region. In some examples, two or more of these techniques may be combined to define a geometry of the region of the composite liner. For example, braided or woven, reinforcement elements may be laid up in a mold, braided, or both, then chopped fibers may be disposed to fill the mold, e.g., for attachment areas or other features of the composite liner.

In some examples, defining the geometry of the region of the composite liner may include positioning the reinforcement elements in one or more of selected orientations, selected regions, or both. For example, as described above, in some examples, the composite liner may include a plurality of reinforcement architectures, a plurality of layers, and/or a plurality of regions. In this way, defining the geometry of the region of the composite liner may include positioning the relatively tougher polymer-based reinforcement elements and the second reinforcement elements in selected orientations, selected regions of the composite liner, or both to define the selected reinforcement architectures as well as layers, regions, or both of a selected strength, toughness, or both.

The technique also may include introducing a matrix material around the reinforcement elements. In some examples, the matrix material (e.g., an uncured form of the matrix material) may be introduced around at least some of the reinforcement elements prior to defining the geometry of the region(s) of the composite airfoil. For example, at least some of the reinforcement elements (relatively tougher polymer-based reinforcement elements, second reinforcement elements, or both) may be in a braided or woven pre-impregnated reinforcement elements, in which an uncured or partially cured form of the matrix material at least partially surrounds at least a portion of the reinforcement elements. In some examples, the matrix material may be introduced around the reinforcement elements after defining the geometry of the region(s) of the composite liner. For example, resin transfer molding may be used to introduce matrix material or a precursor of matrix material into a mold that contains reinforcement elements. In some examples, e.g., examples in which the region(s) of the composite liner include both pre-impregnated woven, 3-D woven pre-form, or overbraided reinforcement elements, matrix material may be introduced both before and after defining the geometry of the region(s) of the composite liner.

Once the matrix material is introduced, the matrix material may be cured. The matrix material may be cured by introducing energy into the matrix material, e.g., via convention, conduction, infrared radiation, ultraviolet radiation, or the like. Curing the matrix material may result in a composite material. In some examples, the composite material may be assembled (e.g., attached) to other portions of the liner, such as support structures or the like, to form the final composite liner.

Clause 1: A composite liner for a gas turbine engine, the composite liner comprising: at least one region comprising a reinforcement architecture comprising a matrix material, a plurality of relatively tough polymer-based reinforcement elements, and a plurality of second reinforcement elements, wherein the plurality of relatively tough polymer-based reinforcement elements and the plurality of second reinforcement elements are embedded in the matrix material.

Clause 2: The composite liner of clause 1, wherein the composite liner comprises an acoustic panel, wherein the region comprises a facesheet of the acoustic panel, and wherein the facesheet is on a support layer.

Clause 3: The composite liner of clause 2, wherein the support layer comprises a honeycomb structure.

Clause 4: The composite liner of clause 3, wherein the facesheet comprises a plurality of channels extending through a thickness of the facesheet and opening into cells of the honeycomb structure.

Clause 5: The composite liner of clause 1, wherein the composite liner comprises a fan track liner, wherein the fan track liner comprises an outer tray, a core, and a septum, and wherein at least one of the outer tray or the septum comprises the at least one region.

Clause 6: The composite liner of clause 5, wherein the septum comprises the at least one region.

Clause 7: The composite liner of clause 5 or 6, wherein the outer tray comprises the at least one region.

Clause 8: The composite liner of any one of clauses 5 to 7, wherein the core comprises a first support adjacent the outer tray, a second support adjacent the septum, and an intermediate layer between the first support and the second support.

Clause 9: The composite liner of clause 8, wherein the second support comprises a first honeycomb structure, wherein the first support comprises a second honeycomb structure, and wherein the second honeycomb structure has a smaller average cell size than the first honeycomb structure.

Clause 10: The composite liner of any one of clauses 5 to 9, wherein a portion of the fan track liner adjacent to a fastener comprises substantially only the second reinforcement elements so that the portion is configured to preferentially fail during a fan blade off event.

Clause 11: The composite liner of claim 1, wherein the composite liner comprises an ice impact panel or an ice impact box.

Clause 12: The composite liner of clause 1, wherein the composite liner comprises the ice impact box, and wherein the reinforcement architecture comprises a three-dimensional braid.

Clause 13: The composite liner of any one of clauses 1 to 12, wherein the reinforcement architecture comprises the plurality of relatively tough polymer-based reinforcement elements and second reinforcement filaments are together in a hybrid or commingled braid or a hybrid or commingled weave Clause 14: The composite liner of any one of clauses 1 to 13, wherein the plurality of second reinforcement elements comprise at least one of an aromatic polyamide, a carbon fiber, E-glass, or S-glass.

Clause 15: The composite liner of any one of clauses 1 to 14, wherein the plurality of relatively tough polymer-based reinforcement elements have an elongation at break of greater than 6.0%.

Clause 16: The composite liner of clause 15, wherein the plurality of relatively tough polymer-based reinforcement elements comprise at least one of a polyamide, a polyester, a polyester terephthalate, a polypropylene, a polyethylene, or a spider silk.

Clause 17: The composite liner of any one of clauses 1 to 16, wherein the matrix material comprises a thermoset polymer.

Various examples have been described. These and other examples are within the scope of the following claims.

What is claimed is:

1. A composite liner for a gas turbine engine, the composite liner comprising:

at least one region comprising a reinforcement architecture comprising a matrix material, a plurality of relatively tough first polymer-based reinforcement elements, and a plurality of second reinforcement elements, wherein the plurality of relatively tough first polymer-based reinforcement elements and the plurality of second reinforcement elements are embedded in the matrix material, wherein the plurality of relatively tough first polymer-based reinforcement elements exhibit a greater toughness than the plurality of second reinforcement elements, wherein the plurality of second reinforcement elements exhibit a lower elongation at break than the plurality of relatively tough first polymer-based reinforcement elements, and wherein the plurality of relatively tough first polymer-based reinforcement elements comprise fibers.

2. The composite liner of claim 1, wherein the composite liner comprises an acoustic panel, wherein the at least one region comprises a facesheet of the acoustic panel, and wherein the facesheet is on a support layer.

3. The composite liner of claim 2, wherein the support layer comprises a honeycomb structure.

4. The composite liner of claim 3, wherein the facesheet comprises a plurality of channels extending through a thickness of the facesheet and opening into cells of the honeycomb structure.

5. The composite liner of claim 1, wherein the composite liner comprises a fan track liner, wherein the fan track liner comprises an outer tray, a core, and a septum, and wherein at least one of the outer tray or the septum comprises the at least one region.

6. The composite liner of claim 5, wherein the septum comprises the at least one region.

7. The composite liner of claim 5, wherein the outer tray comprises the at least one region.

8. The composite liner of claim 5, wherein the core comprises a first support adjacent the outer tray, a second support adjacent the septum, and an intermediate layer between the first support and the second support.

9. The composite liner of claim 8, wherein the second support comprises a first honeycomb structure, wherein the first support comprises a second honeycomb structure, and wherein the second honeycomb structure has a smaller average cell size than the first honeycomb structure.

10. The composite liner of claim 5, wherein a portion of the fan track liner adjacent to a fastener comprises only the second reinforcement elements such that the portion is configured to fail during a fan blade off event.

11. The composite liner of claim 1, wherein the composite liner comprises an ice impact panel or an ice impact box.

12. The composite liner of claim 1, wherein the composite liner comprises an ice impact box, and wherein the reinforcement architecture comprises a three-dimensional braid.

13. The composite liner of claim 1, wherein the reinforcement architecture comprises the plurality of relatively tough first polymer-based reinforcement elements and second reinforcement elements together in a hybrid or commingled braid or a hybrid or commingled weave.

14. The composite liner of claim 1, wherein the plurality of second reinforcement elements comprise at least one of an aromatic polyamide, a carbon fiber, E-glass, or S-glass.

15. The composite liner of claim 1, wherein the plurality of relatively tough first polymer-based reinforcement elements have an elongation at break of greater than 6.0%.

16. The composite liner of claim 15, wherein the plurality of relatively tough polymer-based first reinforcement elements comprise at least one of a polyamide, a polyester, a polyester terephthalate, a polypropylene, a polyethylene, or a spider silk.

17. The composite liner of claim 1, wherein the matrix material comprises a thermoset polymer.

* * * * *